United States Patent [19]

Jimenez

[11] Patent Number: 4,819,903

[45] Date of Patent: Apr. 11, 1989

[54] FISHING POLE HOLDER FOR PORTABLE CHAIRS

[76] Inventor: Louis M. Jimenez, P.O. Box 1916, Oroville, Calif. 95965

[21] Appl. No.: 217,954

[22] Filed: Jul. 12, 1988

[51] Int. Cl.⁴ .............................................. A01K 97/10
[52] U.S. Cl. .................................... 248/538; 248/231.8
[58] Field of Search ............... 248/538, 514, 511, 520, 248/541, 540, 229, 231.8, 314; 43/21.2, 27.4; 297/188, 189

[56] References Cited

U.S. PATENT DOCUMENTS

| 263,606 | 8/1882 | Smith | 248/540 X |
|---|---|---|---|
| 1,321,842 | 11/1919 | Otto . | |
| 2,055,842 | 9/1936 | Haislip . | |
| 2,491,008 | 12/1949 | Lake | 43/21.2 X |
| 2,502,049 | 3/1950 | Kaminski | 248/541 |
| 2,570,584 | 2/1951 | Jaycox . | |
| 3,116,046 | 12/1963 | Risdon . | |
| 3,167,284 | 1/1965 | Lynch | 43/21.2 X |
| 3,452,955 | 7/1969 | Hartwig | 248/229 |
| 4,071,219 | 1/1978 | Seager . | |
| 4,213,649 | 7/1980 | Sell | 248/231.8 X |

FOREIGN PATENT DOCUMENTS 2164531  3/1986  United Kingdom ................ 43/21.2

Primary Examiner—J. Franklin Foss

[57] ABSTRACT

A fishing pole holder for use with tubular framed portable chairs comprising an open ended cylindrical attachment clamp having one longitudinal open side with two outwardly curved flanged edges. The flanged edges form attachment guides allowing the resilient clamp to be easily snapped-on to a framing member of the portable chair. Positioned oppositely of the longitudinal open side is a support ridge the full length of the attachment clamp. Permanently attached at an approximate forty-five degree angle to the longitudinal support ridge is an elongated open ended tube forming a fishing pole handle receiver for supporting a fishing pole.

1 Claim, 3 Drawing Sheets

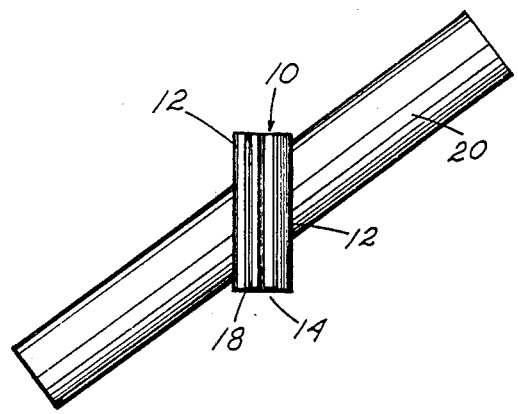
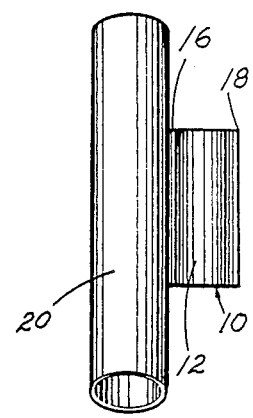
Fig. 1
Fig. 2
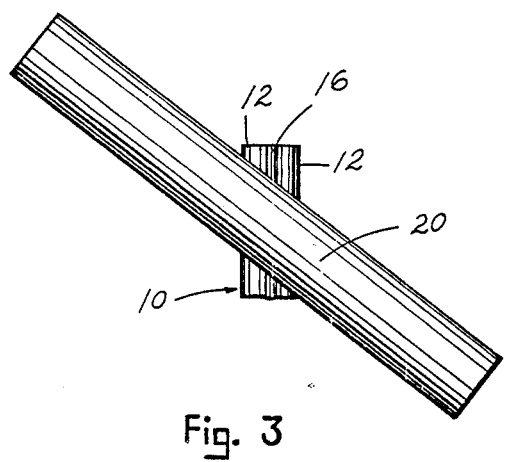
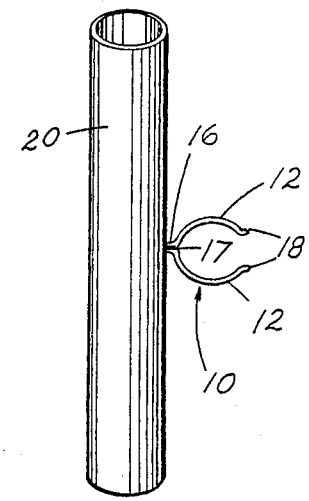
Fig. 3
Fig. 4

FISHING POLE HOLDER FOR PORTABLE CHAIRS

BACKGROUND OF THE INVENTION

1. Field of the Invention

This device relates to fishing pole supports in general and more specifically to a fishing pole holder attachable to the round tubular framing members of portable lawn chairs and the like.

2. Description of the Prior Art

Supports and holders for fishing poles have been used for a long time to relieve the fisherman from the task of holding the pole while he waits for a fish to bite. Many fishermen prefer to fish from docks or beaches where they can use chairs to relax in while they wait. The majority of chairs used for this purpose are portable chairs having exposed round tubular framing members. The present invention is particularly designed as a unique fishing pole holder for use on these tubular folding chairs.

A search was conducted to uncover devices useful for supporting fishing poles on chairs with exposed tubular framing. From the search, past art patents which I considered most relative to my invention were found in the following classes and subclasses:

248/538, 224/922, 297/188, and 43/21.2.

The patents which appear most pertinent to my invention include the following:

1. U.S. Pat. No. 1,321,842, was issued to Otto on Nov. 18, 1919 for a resilient wire support for fishing poles.
2. Haislip was granted U.S. Pat. No. 2,055,842 for a fishing rod support attachable with a "C"-style clamping fixture.
3. On Feb. 6, 1951, Jaycox was issued U.S. Pat. No. 2,540,584 for an adjustable trolling fixture designed to be attached to the gunwale of a boat.
4. Risdon was granted U.S. Pat. No. 3,116,046 on Dec. 31, 1963 for a refreshment container holder attachable to chairs.
5. On Jan. 31, 1978, Seager was granted U.S. Pat. No. 4,071,219 for an extendable fishing rod support device attachable to chairs.

Two of the patents teach devices which are not well suited for attachment to round tubular surfaces. U.S. Pat. Nos. 2,055,842, and 2,540,584 each have rectangular C-clamp bracket attachment fixtures that appear not well suited for clamping against a curved surface. The Jaycox U.S. Pat. No. 2,540,584, is not designed for the quick release of the fishing pole. The pole is held clamped in the pole holder.

The resilient wire support of the Otto U.S. Pat. No. 1,321,842, is designed to aid in supporting a fishing pole with the handle end of the pole abutted against the deck of a boat. The wire material appears as if it would not adequately support a fishing pole without the pole resting on another surface. Also, the Otto rod supporting device appears as if it snaps onto the rod in an area where it may interfere with the line being payed out by the drag system of the reel when pulled by a large fish.

The Seager patent, U.S. Pat. No. 4,071,219, shows a complicated fishing rod supporting apparatus. The position of the pole is more horizontal than vertical which defeats the purpose of the flexible tip of a fishing rod and would cause more fish to get off the hook.

The Risdon U.S. Pat. No. 3,116,046, shows a holder specifically designed to attach to a chair and hold a beverage container. The container supporting section, sized too large for effectively supporting fishing poles, is designed for holding beverage containers upright to avoid spillage. If the Risdon device was attached to the angled framing member of a portable chair, the container supporting section would then be in a somewhat backward angled position. Not only is this angle opposite the slightly forward angle desired for holding fishing rods, but it would also prove more cumbersome for quick removal from the holder when the fisherman is sitting in the chair. If the cup holding section of the Risdon device was modified to hold a fishing pole, and the device was placed on either a front or rear framing portion of the portable chair, the pole would not fit into the holder. It would hit the overhanging armrest of the chair.

Several of the past art fishing pole holders rely on threaded mechanical device such as nut and bolts to help hold the pole. These devices often require tools for installation and removal. Threaded devices often become loose and require retightening, or become corroded and difficult to adjust.

None of the past art patents provided a fishing pole holder suitable for attachment to the rounded tubular framing members of portable chairs which were as quick and easy to apply as my pole holder. I therefore feel my invention provides benefits and advantages not disclosed or anticipated in the devices or any combination of the devices examined in the past art patents.

SUMMARY OF THE INVENTION

My invention is specifically directed towards an easily attachable fishing pole holder for use with rounded tubular framing members of lawn or patio type portable chairs. The invention provides a snap-on attachment clamp which does not require the use of tools or the tightening adjustments associated with C-clamps. The pole holding section of my device is uncomplicated in design and does not require an adjustable fishing pole handle securing means. With my invention the pole handle is loosely, yet securely retained in an angled pole handle retaining tube. The fishing pole is held conveniently positioned angled forward in the direction the line is leading and in an area of the chair where quick and easy removal of the pole from the holder can be accomplished. This placement allows for quick removal of the pole by forward vertical lifting, while at the same time, the pole is securely held if pulled horizontally by a large fish.

Therefore, it is a primary object of my invention to provide a very simple fishing pole holder which is attachable to the rounded tubular framing members of portable chairs.

A further object of my invention is to provide a fishing pole holder which retains the pole in a forward angled position.

An even further object of my invention is to provide a fishing pole holder which securely attaches to a chair without the use of tools.

A still further object of my invention is to provide a fishing pole holder which loosely yet securely retains the handle of a fishing pole enabling quick and easy removal of the pole from the holder.

A further object of my invention is to provide an inexpensive fishing pole holder.

Other objects and advantages of my invention will become better understood with a reading of the specification and considering the numbered parts therein with similarly numbered parts shown in the included drawings.

BRIEF DESCRIPTION OF THE DRAWINGS

FIG. 1 is a frontal view of the preferred embodiment of my fishing pole holder.

FIG. 2 is right side view of the preferred embodiment.

FIG. 3 is a rear view of the preferred embodiment.

FIG. 4 is a top view of the preferred embodiment.

Figure 5:
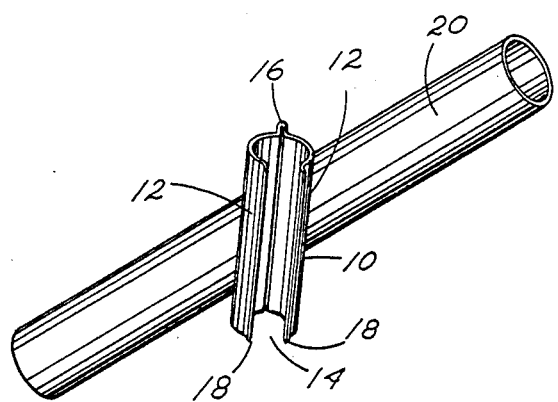
FIG. 5 is a perspective frontal view of the preferred embodiment.

DRAWING REFERENCE NUMBERS 10 frame attachment clamp
12 longitudinal side walls
14 longitudinal opening
16 support ridge
17 open space
18 curved flanges
20 pole handle receiver
22 tubular chair framing member
24 chair
26 fishing pole
28 fishing pole handle
30 fishing reel

DESCRIPTION OF THE PREFERRED EMBODIMENT

Figure 6:
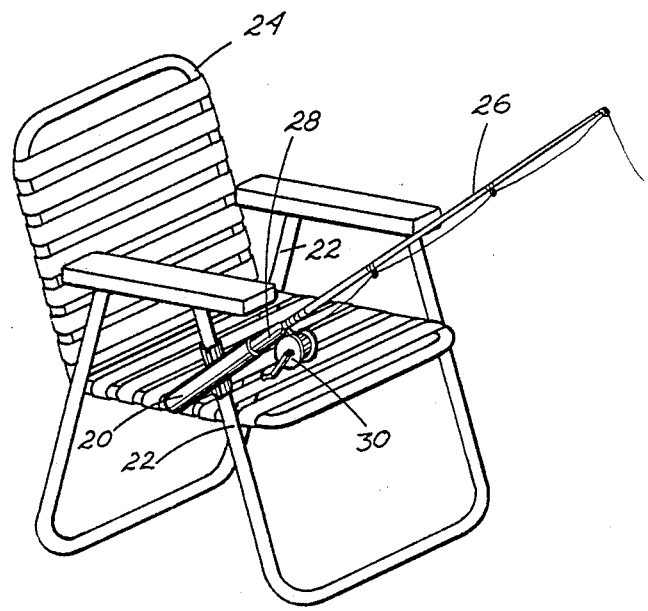
FIG. 6 illustrates my invention attached to a rounded tubular framing member of a portable chair in use holding a fishing pole.
Figure 7:
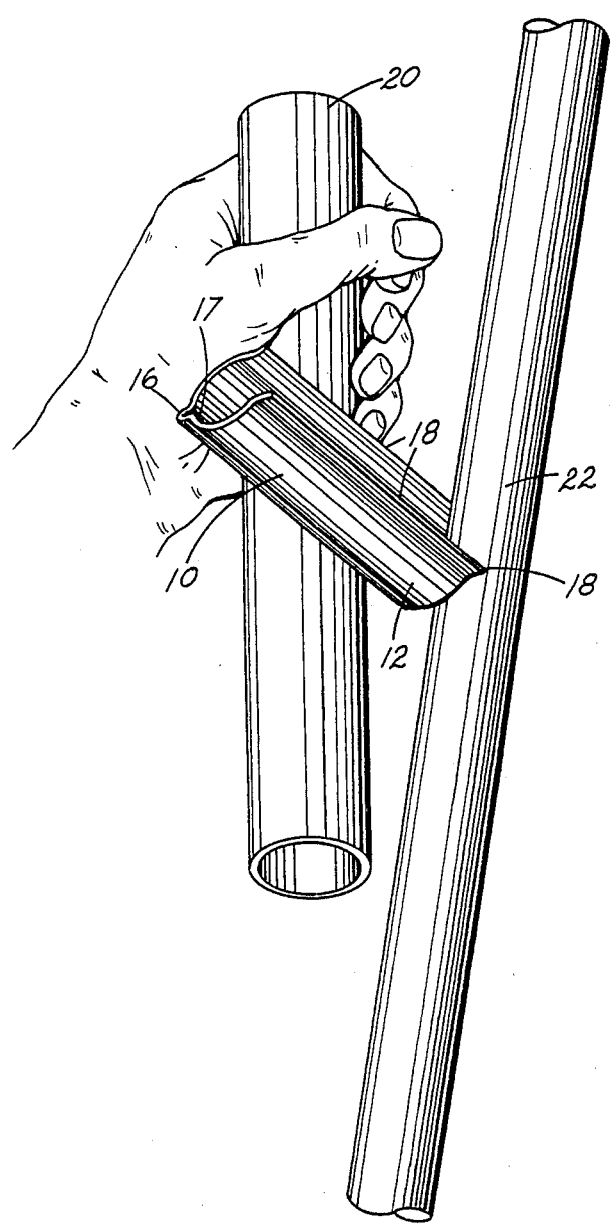
FIG. 7 illustrates my fishing pole holder in the process of being snapped onto a round framing member of a chair.

Referring now to the drawings FIGS. 1 through 5 where the preferred embodiment of the invention is illustrated. The chair attachment section of the invention is comprised of frame attachment clamp 10 manufactured of suitably strong plastic or metal having a degree of stiffness and resilience. Frame attachment clamp 10 is formed of an elongated cylindrical open ended tube-like structure with curved longitudinal side walls 12 making up the main body of frame attachment clamp 10. Longitudinal side walls 12 are separated on one side by longitudinal opening 14. The two terminal edges of longitudinal side walls 12 adjacent longitudinal opening 14 curve outwardly forming curved flanges 18 which serve as guides for attaching frame attachment clamp 10 to chair 24 as shown in FIG. 6 and 7. Positioned oppositely of longitudinal opening 14 is support ridge 16, an outwardly extending longitudinal ridge the full length of frame attachment clamp 10. Support ridge 16 is positioned centrally of longitudinal side walls 12, adding strength to side walls 12 while at the same time allowing frame attachment clamp 10 to spread and contract to fit different sized tubing. Support ridge 16 structured of two walls having a narrow open space 17 between the walls with open space 17 in communication with the hollow center of the tube-like structure of frame attachment clamp 10 giving support ridge 16 a U-shaped appearance if viewed from the end. The two substantially parallel walls of support ridge 16 are attached to longitudinal side walls 12 at one edge with the opposite edges of the two support ridge 16 walls being affixed together with a curved end wall. The outside diameter of the tubular framing members of the different brands of portable chairs seem to vary only slightly. This variance in size is not a problem for frame attachment clamp 10. Both longitudinal side walls 12 and the two parallel walls of support ridge 16 are capable of spreading outward and contracting inward to allow frame attachment clamp 10 to be firmly attached to various sized round tubing.

Pole handle receiver 20 is an elongated, open ended round tube substantially longer than frame attachment clamp 10, made of rigid plastic or metal. Pole handle receiver 20 is diametrically sized to loosely retain fishing pole handle 28 of fishing pole 26 and is centrally permanently attached to the end wall of support ridge 16 at an approximate forty-five degree angle. However, this angle can be varied in manufacturing to accommodate the angles of certain chair frames.

To attach the fishing pole holder to chair 24 as shown in FIG. 6 and 7, frame attachment clamp 10 is positioned at an angle with just the lower corner section of curved flanges 18 abutting the upright front of tubular chair framing member 22. Firm pressure is applied to frame attachment clamp 10. As the lower portion of frame attachment clamp 10 spreads outward and starts slipping onto tubular chair framing member 22, the pressure on frame attachment clamp 10 is manually shifted somewhat upward to spread the remainder of longitudinal side walls 12 and support ridge 16 until frame attachment clamp 10 is completely snapped into position. With this method of affixing the pole holder, only a portion of the spring tension of the resilient frame attachment clamp 10 is defeated at a time. This allows attachment clamp to be made of very stiff resilient material. If a person had to defeat all of the spring tension at once, it would be very difficult.

To remove the pole holding invention, the upper end of pole handle receiver 20 is gripped as if it were a handle, and pulled hard. Frame attachment clamp 10 spins on tubular chair framing member 22 until the lower downwardly extending end of pole handle receiver 20 abuts the horizontal seat framing member of chair 24. Continued pulling will easily remove the pole holder from the chair 24. The abutting of the lower end of handle receiver 20 against a horizontal seat framing member of chair 24 and the gripping of pole handle receiver 20 at the upper end gives a lever and fulcrum effect allowing a person to defeat the strong spring tension of frame attachment clamp 10.

Pole handle receiver 20 when attached to chair 24 is positioned in an approximate sixty-five degree angle due to the sloping angle of the vertically angled framing member between the horizontal framing of the seat structure and the arm rest structure of most portable chairs as shown in FIG. 6. When fishing pole handle 28 of fishing pole 26 is inserted into the interior of pole handle receiver 20, the pole is retained in a forward angled position. Fishing pole handle 28 is prevented from sliding out the bottom of pole handle receiver 20 by fishing reel 30, and is within easy reach for quick removal. Frame attachment clamp 10 once attached to chair 24 will stay attached even when a big fish is hooked and pulling, and fishing pole 26 will stay in pole handle receiver 20 due to the angle unless pulled upward by the fisherman.

Although I have described my invention in detail in the specification it is to be understood that modifications and changes may be practiced in the structure and design of my device which do not exceed the intended scope of the appended claims.

What I claim as my invention is:

1. A fishing pole holder for removable snap-on attachment to round tubular framing members of portable chairs, comprising:
   a chair attachment clamp structured of resilient material in the form of an elongated cylindrical open ended tube-like structure open along one longitudinal side between two curved side walls;
   two outwardly curved guide flanges, one on each of two terminal edges of said two curved side walls adjacent said longitudinal opened side extending the full length of said attachment clamp;
   an outwardly extending U-shaped ridge positioned oppositely of said longitudinal opened side extending the full length of said attachment clamp;
   a fishing pole handle receiver structured of a rigid elongated open ended tube diametrically sized to loosely retain a handle and of a fishing pole, and substantially longer than said attachment clamp;
   said fishing pole handle receiver permanently affixed centrally to said U-shaped ridge of said attachment clamp at an approximate forty-five degree angle.

* * * * *